US009183298B2

(12) United States Patent
Arnaud et al.

(10) Patent No.: US 9,183,298 B2
(45) Date of Patent: Nov. 10, 2015

(54) METHOD AND SYSTEM FOR PROCESSING A SEARCH REQUEST

(75) Inventors: Denis Jean Michel Arnaud, Grasse (FR); Patrick Roger Grandjean, Antibes (FR)

(73) Assignee: Amadeus S.A.S., Biot (FR)

( * ) Notice: Subject to any disclaimer, the term of this patent is extended or adjusted under 35 U.S.C. 154(b) by 1021 days.

(21) Appl. No.: 13/135,685

(22) Filed: Jul. 12, 2011

(65) Prior Publication Data

US 2012/0330982 A1 Dec. 27, 2012

(30) Foreign Application Priority Data

Jun. 27, 2011 (EP) ..................................... 11305820

(51) Int. Cl.
*G06F 17/30* (2006.01)
(52) U.S. Cl.
CPC ...... *G06F 17/30864* (2013.01); *G06F 17/3066* (2013.01)
(58) Field of Classification Search
CPC .................... G06F 17/30911; G06F 17/30985; G06F 17/3061; G06F 17/30864; G06F 17/30522; G06F 17/30657; G06F 17/30672; G06F 17/30684
See application file for complete search history.

(56) References Cited

U.S. PATENT DOCUMENTS

| | | | |
|---|---|---|---|
| 7,174,507 B2 * | 2/2007 | Baudin et al. .................. | 715/234 |
| 7,634,503 B2 * | 12/2009 | Venugopal et al. .................... | 1/1 |
| 2003/0144831 A1 | 7/2003 | Ford .................................. | 704/9 |
| 2004/0008634 A1 * | 1/2004 | Rangarajan ....... | G06F 17/30961 |
| | | | 370/256 |
| 2005/0240943 A1 * | 10/2005 | Smith ..................... | G06F 9/465 |
| | | | 719/328 |
| 2008/0270381 A1 * | 10/2008 | Thomsen .......................... | 707/5 |
| 2009/0094223 A1 * | 4/2009 | Berk et al. ......................... | 707/5 |
| 2010/0223562 A1 * | 9/2010 | Carapella et al. ............. | 715/760 |
| 2012/0151411 A1 * | 6/2012 | Schwartz et al. ............. | 715/809 |

FOREIGN PATENT DOCUMENTS

| | | |
|---|---|---|
| EP | 2541439 A1 | 1/2013 |
| WO | WO 2006/083939 A2 | 8/2006 |
| WO | WO 2010/097319 A1 | 9/2010 |

OTHER PUBLICATIONS

European Patent Office, Search report issued in European Patent application No. 11 305 820.0 dated Oct. 27, 2011.

* cited by examiner

*Primary Examiner* — Angelica Ruiz
(74) *Attorney, Agent, or Firm* — Thompson Hine LLP (57) ABSTRACT

The invention relates to a method and system for processing a search request. A search request including a sequence of data strings and representing a plurality of search parameters is received. The strings are parsed and the search request is interpreted so as to define search parameters by recognizing items reflecting search criteria within the sequence of data strings. A query is built based on the result of the preceding process and at least one travel data service can be interrogated. This improves the search for information based on free-text input from the user.

Application to methods for travel data service interrogation and to search engines.

22 Claims, 9 Drawing Sheets

| Iter1 | Iter2 | RemainingToBeParsed | AssociationList | LongestRecognisedSubList | MatchesSubList | HasMatched | LongestMatch |
|---|---|---|---|---|---|---|---|
| | 1.b | "los angeles rio de janero 22/06 +7 2 adults 1 child 1 dog -lh" | () (empty list of associations) | "los angeles rio de janero 22/06 +7 2 adults 1 child 1 dog -lh" | () (empty list) | False | N/A |
| | 1.b | Id. | Id. | ... | Id. | False | N/A |
| | 1.b | Id. | Id. | "los angeles rio de janero" | Id. | False | N/A |
| | 1.b | Id. | Id. | "los angeles rio de" | Id. | False | N/A |
| | 1.b | Id. | Id. | "los angeles rio" | Id. | False | N/A |
| | 1.b | Id. | Id. | "los angeles" | ("los angeles") | True | N/A |
| 1.d | | "rio de janero 22/06 +7 2 adults 1 child 1 dog -lh" | ("los angeles" ←→¹ "los angeles") | Id. | Id. | True | "los angeles" |
| | 1.b | Id. | Id. | "rio de janero 22/06 +7 2 adults 1 child 1 dog -lh" | () (empty list) | False | N/A |
| | 1.b | Id. | Id. | ... | Id. | False | N/A |
| | 1.b | Id. | Id. | "rio de janero" | ("rio de janeiro") | True | N/A |
| 1.d | | "22/06 +7 2 adults 1 child 1 dog -lh" | ("los angeles" ←→ "los angeles", "rio de janero" ←→ "rio de janeiro") | Id. | Id. | True | "rio de janeiro" |
| | 1.b | Id. | Id. | "22/06 +7 2 adults 1 child 1 dog -lh" | () (empty list) | False | N/A |
| | 1.b | Id. | Id. | ... | Id. | False | N/A |
| | 1.b | Id. | Id. | "" (empty string) | Id. | False | N/A |
| | 1.c | "+7 2 adults 1 child 1 dog -lh" | ("los angeles" ←→ "los angeles", "rio de janero" ←→ "rio de janeiro", "22/06" ←→ "") | Id. | Id. | False | N/A |

LUDWIG

NCE KEF 25/04/08 + 2 adults 1 child 1 dog kit bag   Search  Back

Leave Date
April, 2008

| S | M | T | W | T | F | S |
|---|---|---|---|---|---|---|
|   |   | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 |   |   |   |

From: NCE (NICE)
To: KEF (REYKJAVIK)
Date: Fri, Apr 25 at 8:36pm

715.98 € (+ 150.00 € LUMOS)
KL1264 (operated by KL)          NCE-AMS    Fri, Apr 25 at 11:55am
Fri, Apr 25 at 9:45am
FI503 (operated by FI)           AMS-KEF    Fri, Apr 25 at 3:10pm
Fri, Apr 25 at 2:00pm
FI212 (operated by FI)           KEF-CPH    Fri, May 2 at 6:15pm
Fri, May 2 at 1:15pm
SK793 (operated by SK)           CPH-NCE    Sat, May 3 at 11:30am
Sat, May 3 at 9:10am

Return Date
May, 2008

| S | M | T | W | T | F | S |
|---|---|---|---|---|---|---|
|   |   |   |   | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

730.99 € (+ 150.00 € LUMOS)
AF7701 (operated by AF)          NCE-CDG    Fri, Apr 25 at 11:45am
Fri, Apr 25 at 10:10am
FI543 (operated by FI)           CDG-KEF    Fri, Apr 25 at 3:45pm
Fri, Apr 25 at 2:15pm
FI454 (operated by FI)           KEF-LHR    Fri, May 2 at 9:10pm
Fri, May 2 at 4:10pm
BA242 (operated by BA)           LHR-NCE    Sat, May 3 at 10:15am
Sat, May 3 at 7:20am

740.99 € (+ 150.00 € LUMOS)
AF6205 (operated by AF)          NCE-ORY    Fri, Apr 25 at 10:30am
Fri, Apr 25 at 9:05am

Commercial Links

Fly Blue
www.flyblue.fr

Tea and Fly!
www.tb.com

One week in REYKJAVIK
www.lastminute.com

Flight + Hotel to REYKJAVIK
www.expedia.com

Shopping Basket

Total: 865.76 €

Clear   Book!

Figure 2b

LUDwig

What did you mean? My recommendations are:
NE (NICE), KEF
(REYDAVIK)

Search  Back

| Iter1 | Iter2 | RemainingToBeParsed | AssociationList | LongestRecognisedSubList | MatchesSubList | HasMatched | LongestMatch |
|---|---|---|---|---|---|---|---|
| | 1.b | "los angeles rio de janero 22/06 +7 2 adults 1 child 1 dog -lh" | () (empty list of associations) | "los angeles rio de janero 22/06 +7 2 adults 1 child 1 dog -lh" | () (empty list) | False | N/A |
| | 1.b | Id. | Id. | ... | Id. | False | N/A |
| | 1.b | Id. | Id. | "los angeles rio de janero" | Id. | False | N/A |
| | 1.b | Id. | Id. | "los angeles rio de" | Id. | False | N/A |
| | 1.b | Id. | Id. | "los angeles rio" | Id. | False | N/A |
| | 1.b | Id. | Id. | "los angeles" | ("los angeles") | True | N/A |
| 1.d | | | | | | | |
| | 1.b | "rio de janero 22/06 +7 2 adults 1 child 1 dog -lh" | ("los angeles" ←→ ¹ "los angeles") | Id. | Id. | True | "los angeles" |
| | 1.b | Id. | Id. | "rio de janero 22/06 +7 2 adults 1 child 1 dog -lh" | () (empty list) | False | N/A |
| | 1.b | Id. | Id. | ... | Id. | False | N/A |
| | 1.b | Id. | Id. | "rio de janeiro" | ("rio de janeiro") | True | N/A |
| 1.d | | | | | | | |
| | 1.b | "22/06 +7 2 adults 1 child 1 dog -lh" | ("los angeles" ←→ "los angeles", "rio de janero" ←→ "rio de janeiro") | Id. | Id. | True | "rio de janeiro" |
| | 1.b | Id. | Id. | "22/06 +7 2 adults 1 child 1 dog -lh" | () (empty list) | False | N/A |
| | 1.b | Id. | Id. | ... | Id. | False | N/A |
| | 1.b | Id. | Id. | "" (empty string) | Id. | False | N/A |
| | 1.c | "+7 2 adults 1 child 1 dog -lh" | ("los angeles" ←→ "los angeles", "rio de janero" ←→ "rio de janeiro", "22/06" ←→ "") | | | | |

Fig. 5a

| | | | "+7 2 adults 1 child 1 dog -lh" | () (empty list) | False | N/A |
|---|---|---|---|---|---|---|
| 1.b | | Id. | Id. | Id. | False | N/A |
| 1.b | | Id. | Id. | Id. | False | N/A |
| 1.b | | Id. | "" (empty string) | Id. | False | N/A |
| 1.c | "2 adults 1 child 1 dog -lh" | ("los angeles" ←→ "los angeles", "rio de janeiro" ←→ "rio de janeiro", "22/06" ←→ "", "+7" ←→ "") | Id. | | | |
| ... | | ... | ... | ... | ... | ... |
| 1.c | "" (empty string) | ("los angeles" ←→ "los angeles", "rio de janeiro" ←→ "rio de janeiro", "22/06" ←→ "", "2 adults" ←→ "", "1 child" ←→ "", "1 dog" ←→ "", "-lh" ←→ "") | Id. | Id. | False | N/A |
| ... | | | | | | |

Fig. 5b

| Search data field | Default Value if none specified |
|---|---|
| origin | determined by geolocation (IP address, WIFI/GSM triangulation, GPS, etc) |
| | determined by user preferences |
| destination | determined by popularity from origin (e.g. Paris, France if origin is Nice, France) |
| | determined by user preferences |
| departure date | today + n days |
| | determined by user preferences |
| return date | today + (n + 7) days |
| | determined by user preferences |
| departure time | 12pm |
| | determined by user preferences |
| return time | 12pm |
| | determined by user preferences |
| adult passengers | 1 |
| | determined by user preferences |
| other passengers (children, infants, dogs, etc) | 0 |
| | determined by user preferences |
| cabin (first, business, coach, etc) | coach |
| | determined by user preferences |
| other true/false options (direct flight, jet service, smoking flight, etc) | false |
| | determined by user preferences |

Fig. 6

METHOD AND SYSTEM FOR PROCESSING A SEARCH REQUEST

TECHNICAL FIELD

The present invention relates to the field of data service interrogation, particularly at processing stages of client search requests.

BACKGROUND

Web based techniques applied to the travel and tourism industry have dramatically improved the processing of search queries. First a graphical user interface is now a typical means for inputting request data in a quite friendly manner. This interface includes several fields to be filled to specify the criteria of the request. One drawback of the current interfaces is that the user is required to fill several fields each time he/she wants to build a request.

This drawback can be illustrated in the case of web-based computer reservation systems in the travel and tourism industry.

Online distribution systems of travel and leisure are known on the market today. Among some well-known ones are found: Kayak®, bing®, Expedia®, Orbitz®, Yahoo® Travel®, and Travelocity®.

In general, when a user wants to book e.g. an airplane ticket online, the user must fill at least three different fields: one for the origin, one for the destination, one for the requested departure date and still another one for the return date. Furthermore, the user must also fill one additional field for each of the following options: cabin, number of travelers, preferred time of departure, etc. Another drawback is, if the user wants to change the destination or any other information provided after a first search, he/she will in most cases need to start all over, filling all the fields once more, including the mandatory ones.

Hence there is a need for an improved method for processing search requests where the user's input is made easier. There is also a need for a method and a system that preserves accuracy of source interrogation with the use of well-defined search parameters, without implying a complex input from the user's standpoint.

There is also a need for a universal interface which does not require any user expertise as to field formats or significations.

SUMMARY

At least some of the foregoing and other problems are overcome, and other advantages are realized, in accordance with the embodiments of this invention. In one aspect thereof the exemplary embodiments provide a method for processing a search request comprising the following steps performed with at least one data processor:
  receiving a search request comprising a sequence of data strings;
  parsing the data strings comprising recognizing at least two matching items among a set of pre-determined items;
  interpreting the search request comprising defining search parameters by correlating each matching item with a search data field;
  building a query based on the search parameters.

In another aspect thereof the exemplary embodiments provide a system for processing a search request comprising:
  Means for receiving a search request comprising a sequence of data strings;
  A parsing engine for parsing the data strings comprising recognizing at least two matching items among a set of pre-determined items;
  Means for interpreting the search request comprising defining search parameters by correlating each matching item with a search data field;
  A query builder for building a query based on the search parameters.

BRIEF DESCRIPTION OF THE DRAWINGS

The present invention will now be described in details with reference to the drawings for the purpose of illustrating the preferred embodiment.

DETAILED DESCRIPTION

The invention can be implemented with computer hardware and software means. It can include a server side where the processing of data applicable to a customer takes place. This server side—which may be comprised of single or plural computer devices—preferably communicates via network resources with at least one remote user device such as but not exclusively a desktop computer, a smart phone or the like.

More generally, the invention can be implemented on any device. Mobile phone applications are targeted as well as web browsers. TV (including games) displays can also be used to implement the user interaction with the system.

Before turning to the figures to describe preferred embodiments of the invention, some optional features of the invention which can be used cumulatively or alternatively are introduced hereafter even though they will be later presented in detail:
  it comprises displaying at a user device a web page with an input zone;
  it comprises creating the sequence of data strings by a free-text input of a user in the input zone;
  it comprises transmitting the sequence of data strings to the processor.
  the step of parsing the data strings comprises the step of recognizing a first matching item by identification of a longest portion of the sequence of data strings that matches one item among the set of pre-determined items and defining said item as the first matching item.
  the identification comprises (i) setting the whole sequence of data strings as potential longest portion, (ii) comparing the potential longest portion with the set of pre-determined items, and (iii):
    setting the potential longest portion as longest portion upon a positive comparison;
    or, upon a negative comparison, creating a new potential longest portion by removing from the previous potential longest portion one data string located at the side of an extremity situated opposite a starting extremity of the sequence of data strings, and repeating the steps (i), (ii) and (iii) as long as no positive comparison is reached.

the step of parsing the data strings further comprises a step of recognizing a further matching item by defining a remaining portion as the difference between the sequence of data strings and the first matching item, and, beginning from an extremity situated opposite a starting extremity of the sequence of data strings, identifying a longest portion of the sequence of data strings that matches one item among the set of pre-determined items and defining said item as a further matching item.

the step of recognizing a further matching item is repeated by defining a further remaining portion as the difference between the previous remaining portion and the previous further matching item, and, beginning from an extremity situated opposite a starting extremity of the sequence of data strings, identifying a longest portion of the sequence of data strings that matches one item among the set of pre-determined items and defining said item as a another further matching item, and wherein the step of recognizing a further matching item is repeated until the further remaining portion is empty.

the step of parsing the data strings comprises determining a distance value between a portion of the sequence of data strings and at least one item of the set of pre-determined items.

the invention comprises setting said item as matching item upon the distance value being below a pre-determined threshold.

the invention comprises, when said item and the corresponding user input part are different (but in said distance), requesting a user confirmation that said item is to be used in lieu of said portion of the sequence of data strings and, upon receipt of the user confirmation, using said item as matching item.

requesting the user confirmation comprising displaying an amended sequence of data strings at a user device, in which said portion of the sequence of data strings is replaced by said item.

There is a step of displaying the amended sequence of data strings in the form of a hyperlink and detecting the user confirmation upon a user click action on said hyperlink.

those said steps may be replaced by auto-completion techniques.

the search request is for travel service information.

the step of interpreting comprises correlating at least one matching item with a search data field selected among a travel origin, a travel destination, a departure date.

the set of pre-determined items comprises travel cryptic commands.

the step of building comprises defining default search parameters and basing the query both on the search parameters and on the default search parameters.

user profile data, when known, are used for defining the default search parameters.

the query is a low fare search request;

it comprises the step of sending the query to at least one data service, receiving a response to the query and transmitting a reply to the search request.

it comprises the step of building a query comprises converting at least one matching item into a formatted item whose format is compatible with the travel data service;

it comprises accessing at least one data repository storing correspondence tables between pre-determined items and formatted items.

it comprises incorporating the reply in a web page.

the web page incorporates an editable search request definition area filled by default with the sequence of data strings.

the web page incorporates an editable search request definition area filled by default with the amended sequence of data strings.

the set of pre-determined items is stored in at least one database.

The invention is performed as a result of execution of computer software by at the least one data processor, the computer software being stored in a non-transitory computer-readable memory medium.

The invention will now be described in the field of travel reservation systems aimed at providing, upon request, information (availability, price . . . ) and booking services to users. This exemplary application can be related to air travel only or to any kind of travel and leisure products such as, for instance, hotels, cars, cruises, vacations, etc. It is not however limiting the scope of the invention.

Figure 1:
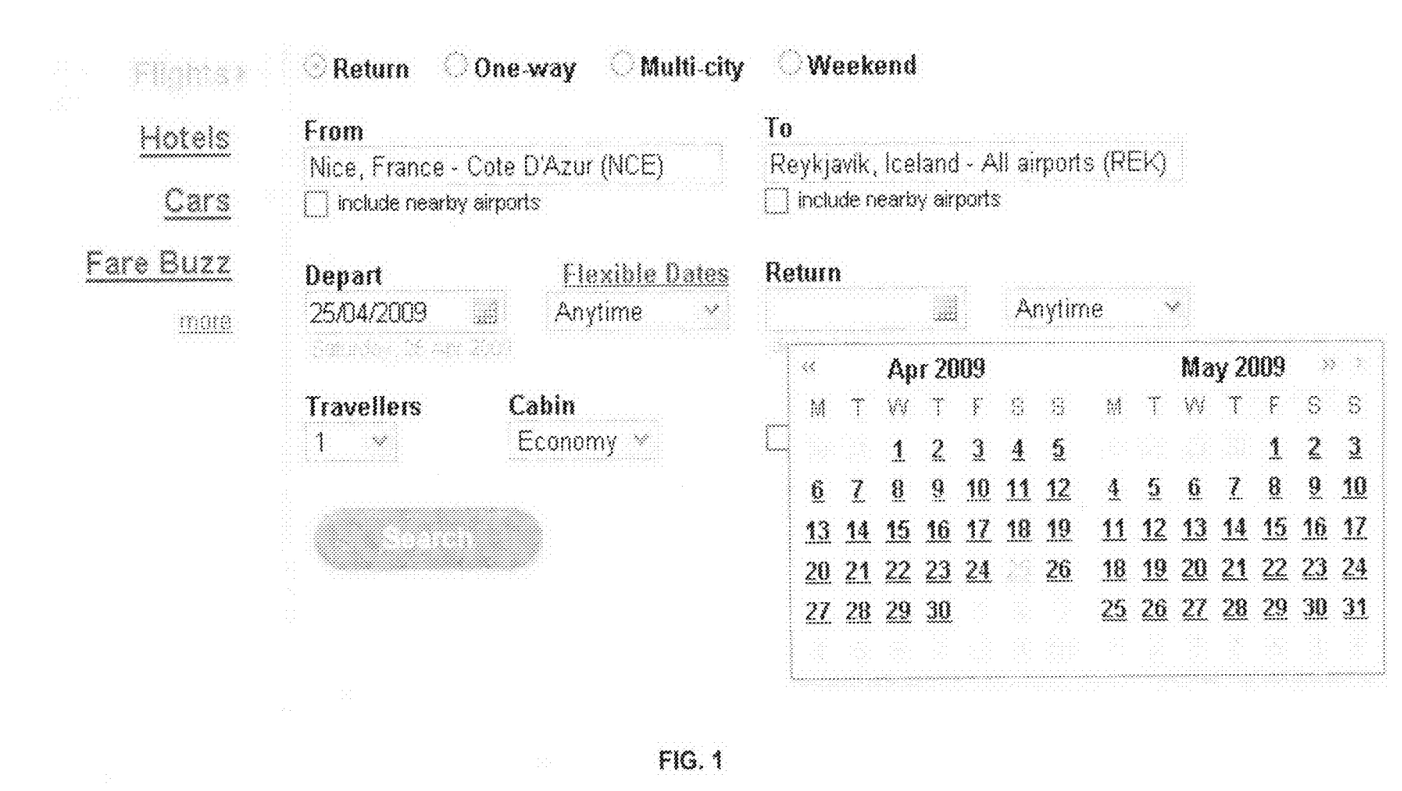
FIG. 1 shows a screen print from a conventional travel booking web page.

FIG. 1 shows a classic rich interface for booking a flight ticket according to the prior art. When a user wants to book a ticket from an origin to a destination on a given date, then the user must fill at least three different fields:

One for the departure city, one for the destination and yet another one for the departure date. Moreover, when the search is for a return trip (i.e., most of the cases), a fourth field must be filled with the return date.

As can be further seen from FIG. 1, many additional options can be chosen as well. Each one of them requires ticking a box or choosing an item from a drop down list. Examples of additional options are: cabin, number of travelers, preferred time of departure, preferred time of return, include nearby airports on the departure or the arrival, etc.

It is also well-known that most of the time, after a first search, if the user either wants to change departure or destination city, for instance, the user will have to fill in all the fields again, including the mandatory ones.

The interface of FIG. 1 is a rather complex interface lacking user-friendliness, but corresponds to most well known Web sites dedicated to travel and leisure reservation services.

Figure 2A:
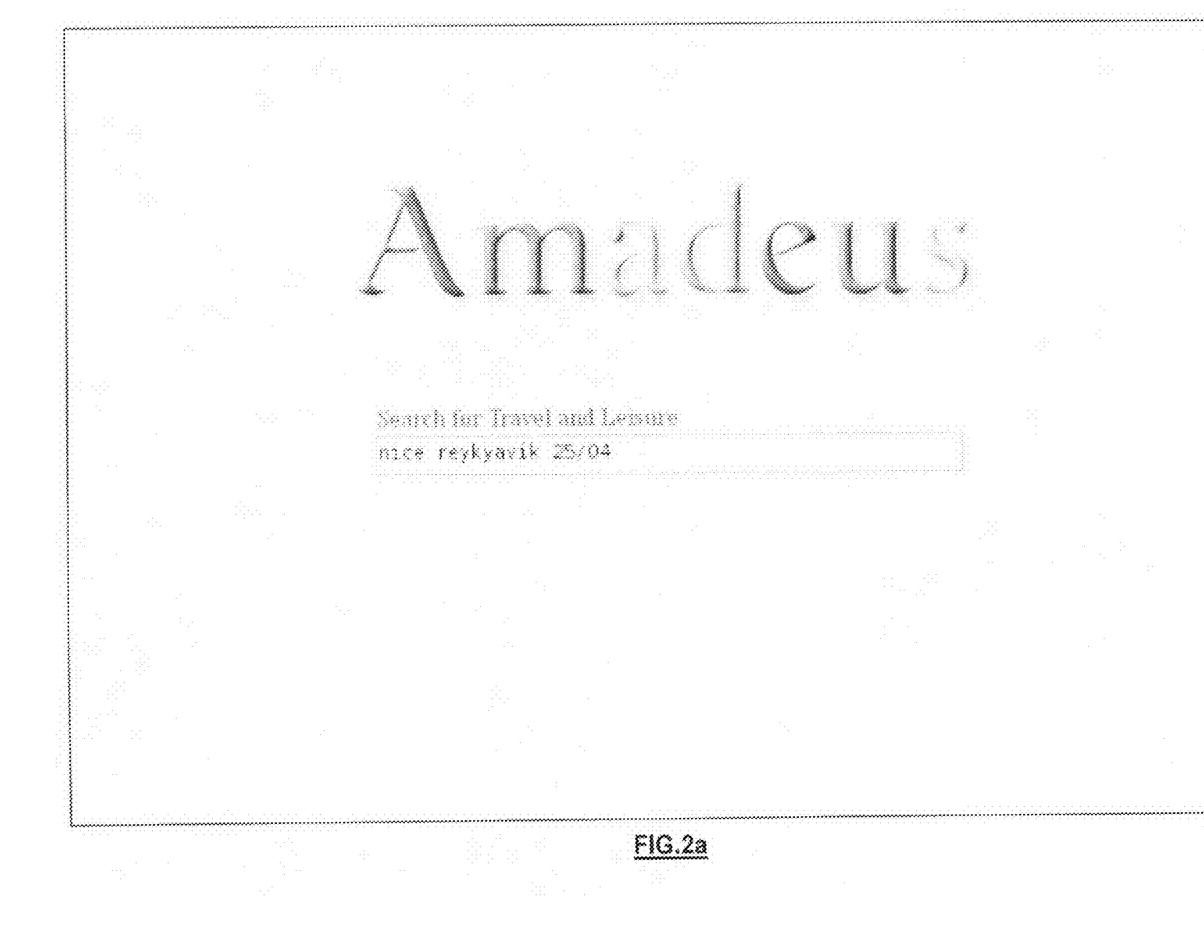
FIG. 2a shows one embodiment of a possible search web page according to the invention.

On the other hand FIG. 2a shows a simple yet powerful input interface according to the present invention. In FIG. 2a, the online user is presented with a very simple web page containing only a logo and a search request input zone. The user can enter several keywords describing the requested trip.

An example of such keyword sequence could be "nce nyc 22/03" describing a request for the $22^{nd}$ March from Nice, France to New York, USA. Or "Nice Paris summer 2 adults 1 child" describing a request for a trip planned for next summer involving a family. More generally, the keywords may be entered in a way closer to natural language.

In the example from FIG. 2a, the user wants to go from Nice to Reykjavik on the $25^{th}$ of April, and return 7 days after departure. There are 2 adults traveling with one child and one dog. The end user wants for example to limit the search for offers coming from KLM ("kl"), Finnair ("fi"), Air France ("af") and British Airways ("ba"). Although the input page displayed at the user device 1 may include other input areas, it is preferred that it only includes the previously described input zone. The input of the user may comprise any characters he/she can type using a keyboard, a mobile touch screen or any other input means. This includes letters, numbers, symbols or any other characters. Spaces or some characters such as "-" or "/" can be used by the user so that a plurality of data strings are defined within his input. Data strings are then groups of characters within the sequence. Data strings can correspond to a word or a portion of a word, an abbreviation, cryptic commands, date or date range representations or entries with any other group of characters reflecting one aspect of the user request.

Preferably, the sequence of data strings is understood by the invention method and system as comprising a first extremity and a second extremity. The first extremity is defined as the starting extremity which is the beginning of the sequence. Typically, this corresponds to the extremity where the user input has started and/or where the reading of the sequence would normally start. The second extremity is the one situated opposite the first extremity. This will usually correspond to the end of the sequence.

The sequence of data strings will thus be generated by a free-text input of the user in the input zone. Each data string will typically reflect one keyword or a portion of a keyword the user wishes to use for the request. The terms "free-text" and "keyword" shall here be understood as any set of characters as previously presented.

The search request comprising the sequence of data strings is then forwarded in the form of a message of any conventional type to a remote portion of the invention. The forwarding step can be triggered by any means such as by pressing the "enter" button of a keyboard, clicking on an icon or else. Web technologies are advantageously used for communication purposes as well as for the interface management at the user level. Mobile applications on the user end are also possible. By way of example, any browser and any Internet protocol can be implemented.

Figure 3:
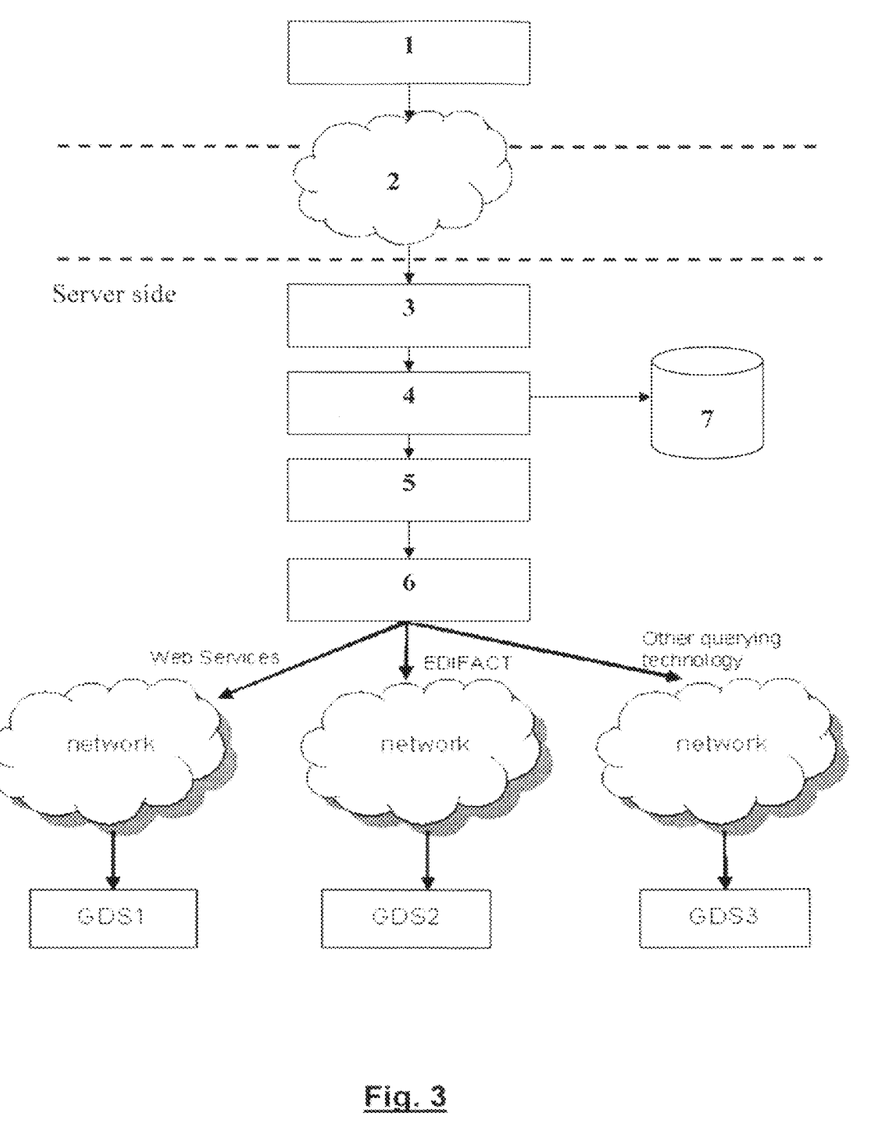
FIG. 3 depicts components involved according to an embodiment of the invention.

FIG. 3 depicts that the user device 1 is advantageously in bilateral communication with a server side via a network 2 such as the internet.

The server side may include means 3 for interfacing with at least one user device 1. Means 3 for interfacing will usually comprise means for receiving the search request from the user device 1 and means for transmitting a reply to the user device 1. The server side also preferably comprises a parsing engine 4, interpreting means 5 and a query builder 6 which will all be described hereafter. All these components advantageously involve or share at least one data processor.

The parsing engine 4 is configured to analyze the sequence of data strings in the perspective of detecting items which could reflect the wishes of the user, i.e. search parameters. Such items are advantageously a list of elements (such as words, groups of words, dates or date ranges, numbers and signs) that are pre-determined and stored in at least one data repository. An example of repository is depicted in FIG. 3 in the form of a database 7. It is worth saying that a plurality of repositories can be used and at least one of them can be located remote from the parsing engine 4 and connected via any communication means.

Items can non limitatively comprise:
names of airports, of cities, of countries, of continents;
dates, seasons;
passenger type definition such as "adult", "child", "children", "infant";
special requests or service names, such as "wheel chair", or "vegetarian meal".

In one embodiment of the invention, plural repositories are used, each for specific data. By way of example, one repository can be for cities and airports, another one for dates and time, a further one for airlines and so forth. Such repositories may consist in data storage means used for other purposes. In the case of travel reservation systems, one database can be used both for the invention as well as for other parts of the reservation system. For instance a database of airport names used in the context of flight schedules or fare quote operations between origin and destinations can also be accessed for the invention.

The invention compares the data strings of the search request with the stored items in an attempt to detect a match which indicates that a matching item has been recognized in the data strings.

A detected match can be a full match (all the characters of an item match all the characters of at least one data string), or an approximative match (the two compared elements are sufficiently close to be deemed to match). In the latter case, a vicinity criterion can be used which reflects a distance between the two compared elements: this can be defined, for example as the number of wrong letters within a given word. More sophisticated formula may also be applied, such as the square root of the sum of the squares of the numbers of wrong letters within any given word. Correct alternatives to the misspelled word are then ordered according to their distance to that word.

In case the match is not a full match, the system may automatically apply a correction or return a message to the user device, requesting the user to confirm that the corrected element (the matching item) is what he/she actually meant. Preferably, this is done by returning the full free-text in a corrected version (or a few possible corrected versions). The user can then confirm the appropriate corrected version, for example by simply clicking on a hyperlink embedding the corrected version. This triggers a message from the user device 1 to the parsing engine via means 3.

Another preferred embodiment is auto-completion (implemented through dedicated JavaScript client-side libraries), where the user is directly presented with the right search items.

Thanks to this feature, the user is guided so that the right request is built before it is sent over the network.

In a preferred embodiment of the invention, the parsing stage follows a special algorithm. The parsing engine 4 tries to recognize the largest item embedded in the request by starting from second extremity of the sequence (i.e. starting from the end of the sequence when reading it). At the start, the whole sequence is considered. If no item matches, one data string is removed from consideration and the new potential longest portion of the sequence is compared with the items. The process goes on until the considered portion of the sequences matches an item. This item is then set as first matching item.

The invention then tries to recognize a further item. The portion of the sequence corresponding to the first matching item is removed from consideration thus leading to a remaining portion. This portion is parsed the same way as the whole sequence has been parsed before, until a second matching item is found.

A new remaining portion, where both first and second matching items are removed from consideration, is then considered.

The process goes on until no further matching items can be found.

The number of matching items is not limited. The invention can detect two or more items even though they are originally incorporated in a single input zone of the displayed input page.

Figure 5A:
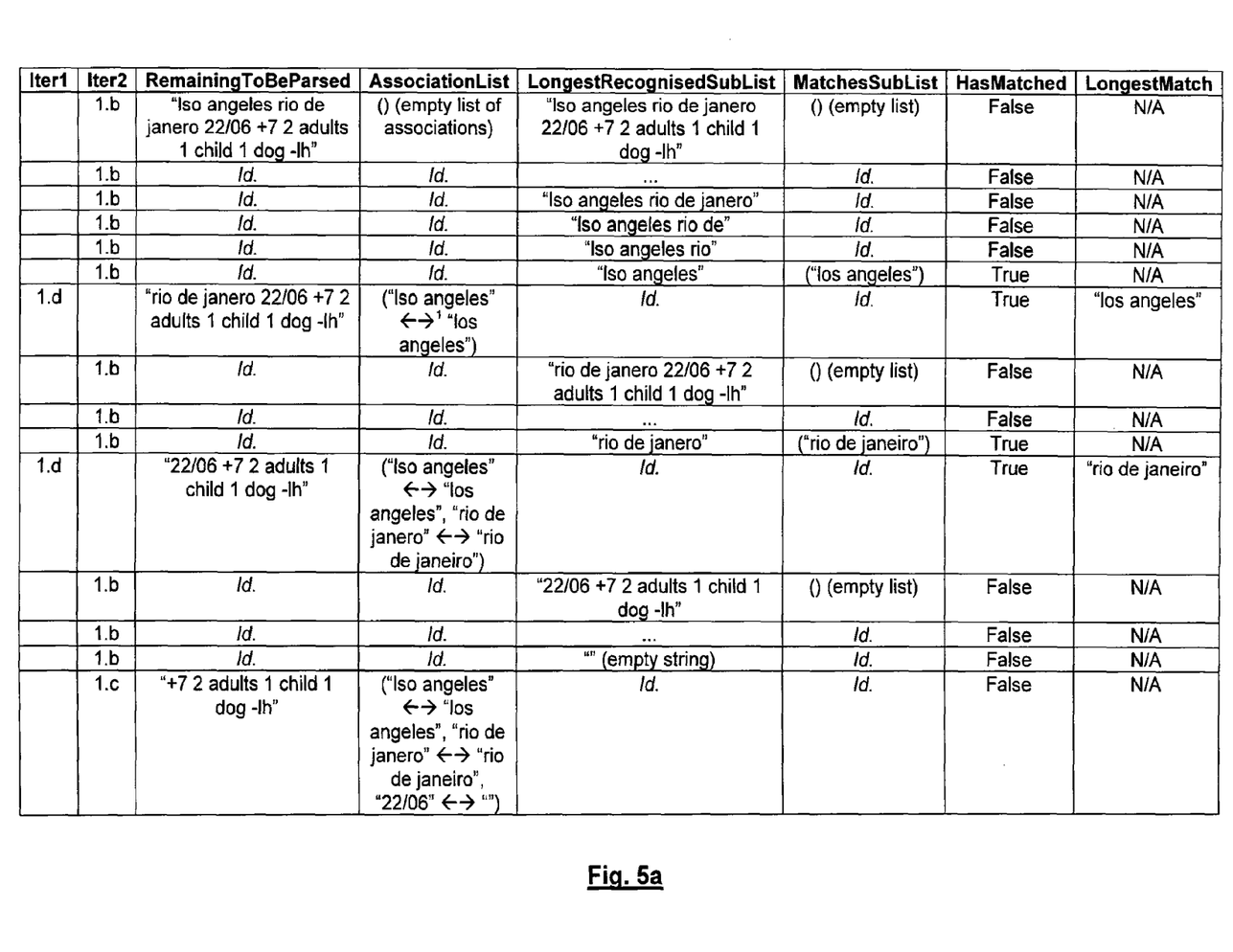
FIGS. 5a and 5b show an example of processing steps for parsing a request.
Figure 5B:
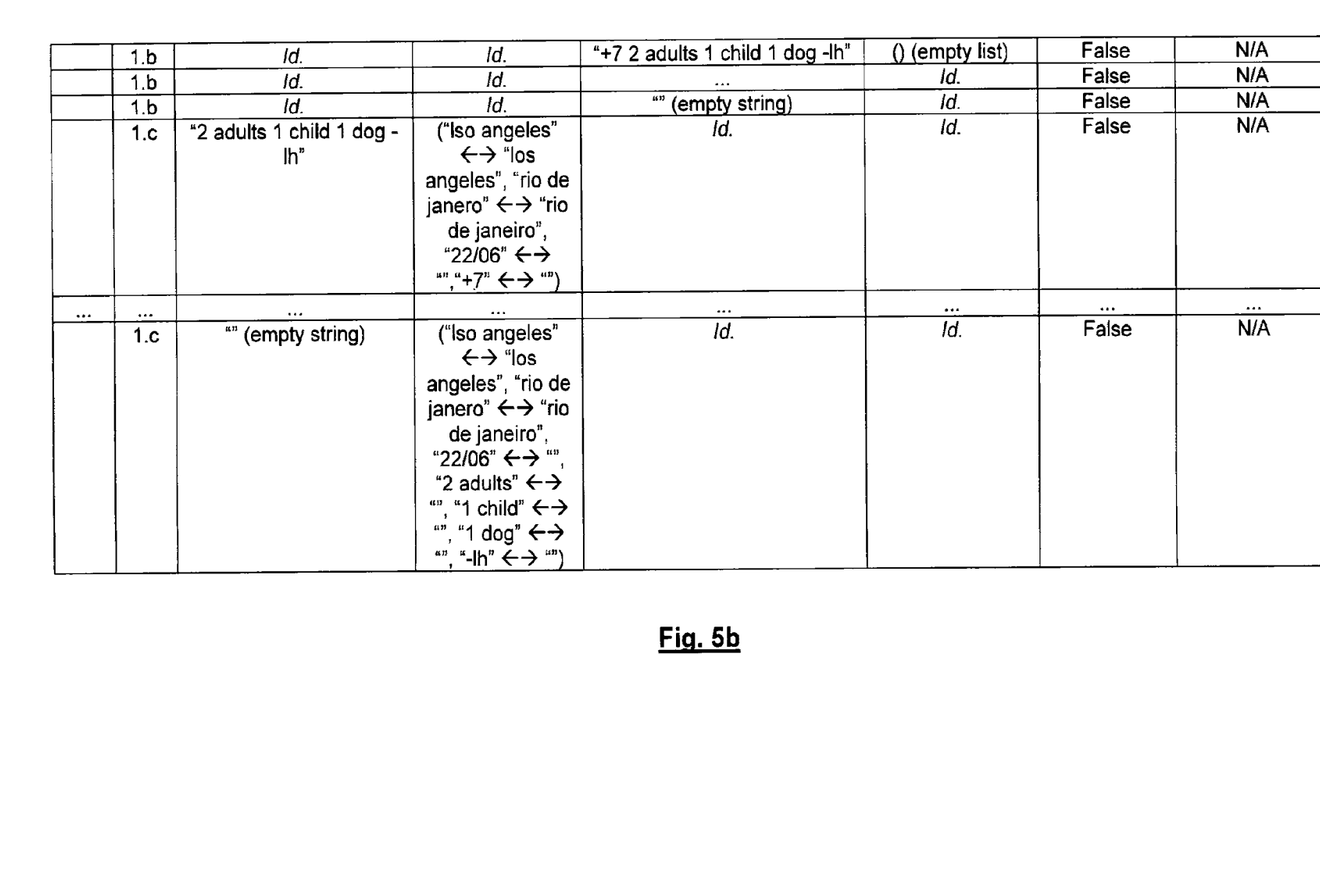

An example of the steps described above is explained hereafter and in connection with FIGS. 5a, 5b which represent chronological stages of the parsing process.

The abbreviation "iter" in the FIGS. 5a and 5b stands for iteration and refer to various sub-step of the stage "1—iterate until "Remaining-to-be-parsed" is empty detailed hereafter. The "remaining to be parsed" corresponds to the remaining portion described above, i.e., to the sequence of data strings minus the already recognized matching items. At the start of the process it is set as the full sequence. The "association list" is the list of matching items/data strings couples already found. The "longest recognized sublist" corresponds to the remaining portion of the sequence to be parsed. The "matches sublist" is for identifying a match in a current iteration. In case of such identification, the "Has matched" Boolean is set to "True". The "longest match" identifies the longest item that matches during a current iteration.

More details are given hereafter:

Take for instance the following request: "lso angeles rio de janeiro 22/206+7 2 adults 1 child 1 dog-ih".

0. Initialisation
  a. Let RemainingToBeParsed string be equal to User Request.
  b. Let AssociationList be empty.
1. Iterate until RemainingToBeParsed is empty.
  a. Initialisation.
    i. Let LongestRecognisedSubList string be equal to RemainingToBeParsed.
    ii. Let MatchesSubList list be empty.
    iii. Let the HasMatched Boolean be false.
  b. Iterate on each of the reference data sets (items such as geographical, time airlines, etc.).
    1. Apply an Approximate Pattern Matching algorithm between LongestRecognisedSubList (the searched string) and the current reference data set. Add all the matches, along with their corresponding edit distance and their data type, to MatchesSubList.
    ii. If MatchesSubList list is empty, remove the last data string from the LongestRecognisesSubList string; else, set the HasMatched Boolean to true.
  c. If HasMatched Boolean is false and the LongestRecognisedSubList string is empty:
    i. Associate the first data string of the RemainingToBeParsed string with the empty string, and add that association to the AssociationList list.
    ii. Remove the data string of the RemainingToBeParsed string.
    iii. Continue at "1—Iterate until RemainingToBeParsed is empty."
  d. By construction, there has been a match. Thus:
    i. Let LongestMatch string be equal to the first item (string) of the MatchesSubList list.
    ii. Associate the LongestMatch string with the LongestRecognisedSubList string, and add that association to the AssociationList list.
    iii. Remove/subtract the LongestMatch string from the beginning of the RemainingToBeParsed.
2. The AssociationList list contains, for each data string or group of data strings the corresponding matches against the reference data sets which are the predetermined items.

At this stage, matching items have been recognized. They are then used to define search parameters. This is performed thanks to the interpreting means 5.

In a preferred embodiment described therein, the interpretation occurs after all matching items have been recognized. However, the interpretation may begin upon recognition of only one or of a few matching items.

The interpretation consists in identifying search parameters among the matching items previously recognized during the parsing stage. Rules are advantageously used for the interpretation.

The process first advantageously takes the type of the matching items into account. As previously indicated, the items can reflect various types of information such as geographical information, date information . . . .

On the other hand, the system preferably holds a list of potential search data fields which are associated to at least one type of items (Search data fields correspond to search parameter types). Examples of fields are given in the first column of FIG. 6. By way of example, fields such as origin and destination are linked to items types related to geographical information, (including cities, airports, countries, continents . . . ). Departure date and return date will also often be used as parameters.

Thus one matching item can potentially be associated with at least one search data field depending on its type.

Further rules are preferably used to overcome any ambiguity when one matching item is potentially associated to a plurality of search data fields.

Examples are given hereafter:

"if only one geographical item is present in the matching items, set it as destination". This rule can be combined with other rules such as "and set the origin parameter's value to a value determined by geolocation" (IP address, Wifi/GSM triangulation, Global Positioning System data . . . ) or "and set the origin parameter's value to a user preference value". Indeed the system can use information from a profile management system storing personal data about the user or a traveler. Such data can also be used as default values for other parameters. For instance, the preferred departure airport may be specified, as well as some preferred default for the passenger type and special request descriptions. When the user is then recognized by (i.e., logged into) the Invention, he/she may only enter as a "search request" non already registered information. For instance, if the profile holds the fact that the user usually travels with his/her family (e.g., two adults, their child and a dog) from San Francisco, Calif., USA, he/she may only enter "mia winter" when looking for a trip on the next winter to Miami, Fla., USA.

Similarly, if the user has registered the place where he/she has already been and expressed his/her wishes for the places he/she would like to visit, some advertisement may be displayed even before the user has typed anything in the input field, targeted to the recognized potential needs of that user. The interpreted user request may also be used as an information basis for selecting advertisement matching the user's wishes.

Figure 6:
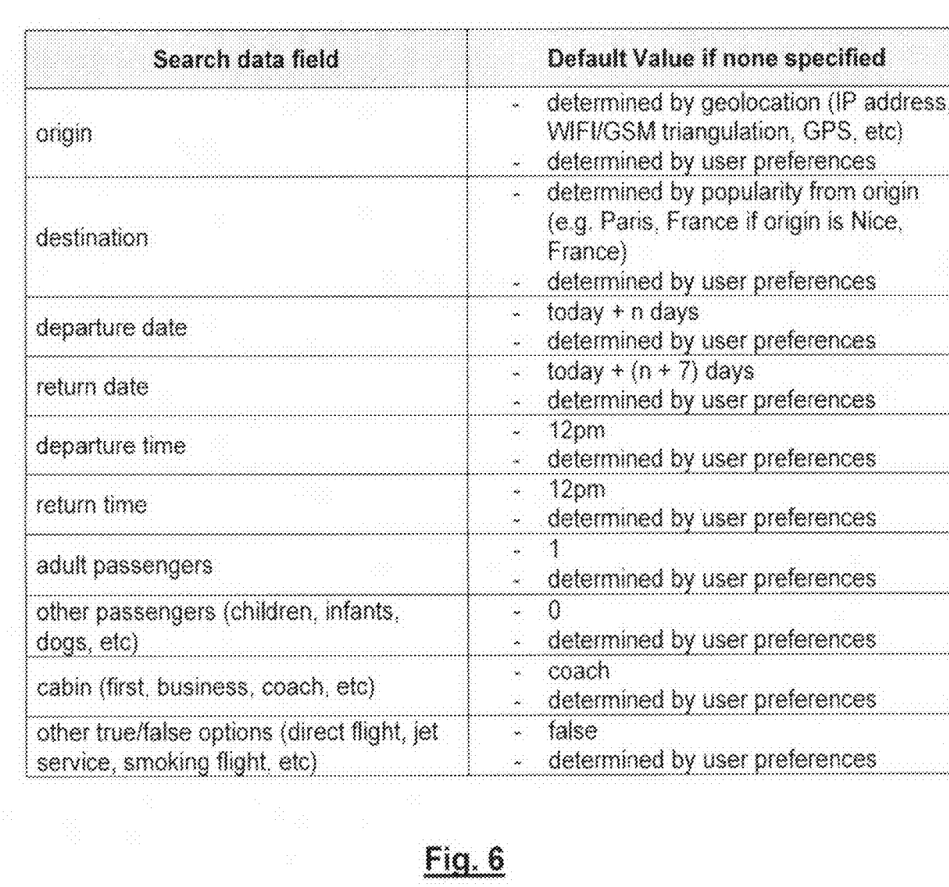
FIG. 6 is a table giving examples of parameters and values.

FIG. 6 provides several examples of default values depending on the search parameters.

Default values may also be derived from information contained in repositories the invention can access to. As previously indicated, reservation systems usually include a lot of information split into several databases or repositories. The invention may benefit form these information sources at the step of defining default parameters. The example of user profiles has already been described. User data may also derive from PNR data (PNR stands for Passengers Name Record) stored at a ticketing facility. Another example is schedule data which may help determine the destination of the travel based on an origin and in view of flights existing from that origin. The same may apply to determine a destination. The above examples are not exclusive and any other sources of data (such as sources used for availability or fare determination) can be used.

At the end of the interpreting stage, matching items have been each associated with one search data field and the matching item is set as value for such data field thus creating a search parameter (which is here defined as the association of a search data field with a value).

Turning back to FIG. 3, a query can then be built by a query builder 6. The query builder is in charge with the construction of a query message that fits the format of one travel data service or of its communication channel. It associates the search parameters (or at least some of them) to base the query. Several queries can be built each time several travel data services working with different formats are interrogated.

FIG. 3 shows that three travel data services are involved with three different formats: Edifact, Web Services and other querying technologies.

Figure 4:
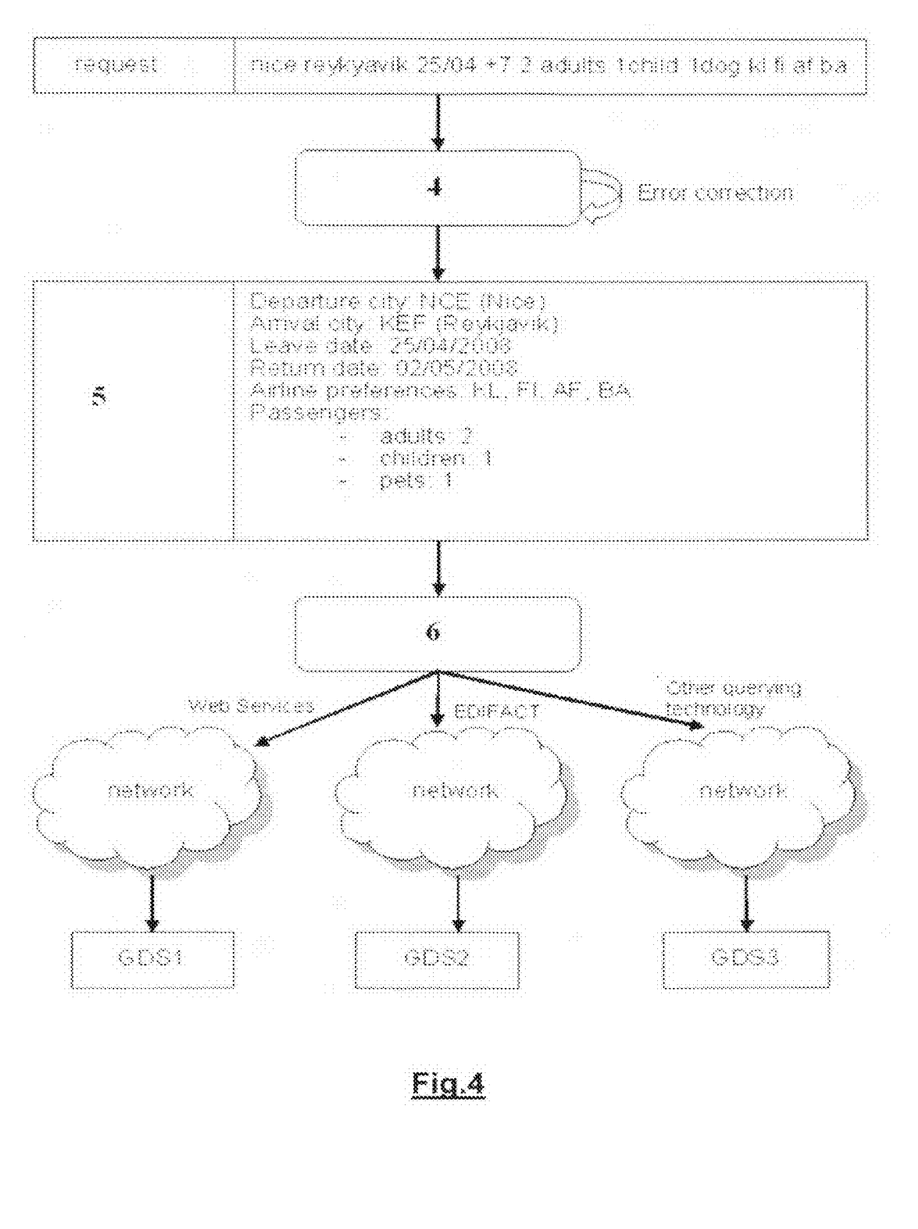
FIG. 4 is a schematic showing steps of booking an airline ticket according to the present invention.

At the query building stage or at a previous stage, a matching item may be translated into a formatted item which represents a generic format of an item. Most search engines, especially in the travel industry, use to perform searches based on formatted data fields. For instance, city or airport codes as well as airline codes are defined for the whole industry and are used as input of the search systems. At the same time, the user may not be aware of these codes (or not have any knowledge of the language of the website; e.g.: the user is an English citizen accessing a Japanese website). The invention copes with this by proposing an automatic translation of the matching items into another format such as a code format or a foreign language format. As depicted in FIG. 4, the input string "NICE" of the request is detected as a matching item and translated into "NCE" which corresponds to a IATA code for this airport (IATA is the acronym of International Air Transport Association). Similarly "Reykjavik" is converted into "KEF".

Data repositories can be used for the translation step in which several similar items (corresponding to the same search parameter) are specified with correspondence tables. Again the invention can benefit from information already existing in computer reservation system such as Low Fare Search (LFS) systems implemented for the Travel and Tourism industry.

The nature of the travel data service(s) is not limited. Travel data service can be a remote system in communication with the query builder via any communication means such as Internet.

Preferably, the travel data service comprises a search engine and at least one local or deported data repository. By way of example, the search engine can be a Low Fare Search Engine as used in the travel and tourism industry.

It is an advantage of the invention to easily create queries adapted to various search engines of travel data services.

In addition, the invention enables the user to obtain accurate information obtained by a real time interrogation made with a search engine. In one example, the interrogation is made by a search engine in the form of a low fare search request.

FIG. 3 depicts three travel data services in the field of the travel and tourism industry, GDS 1, GDS2 and GDS3 where GDS stands for Global Distribution System.

After the travel data service has processed the query, a reply is constructed in destination of the user device 1. The reply can be directly built and sent by the travel data service(s) (e.g. one GDS) or the response obtained from the travel data service(s) is (are) transformed at another level, to generate the final reply to be sent to the user.

In one embodiment, receiving means 3, the parsing engine 4, the interpreting means 5, the query builder 6 and means for preparing the reply are integrated in the same computer system and preferably in the same server In case several travel data services are interrogated, their responses are then aggregated while generating the reply.

An example of the invention is now further described in the field of travel distribution systems.

In a preferred embodiment, the result of the Low Fare Search (LFS) request is displayed as a list of hyper-links pointing to the corresponding Travel Recommendations (TR), ordered by default according to their travel times vs. prices. The Travel Recommendation details are displayed, as well as hyper-links to book them. Here, again, the details of the Travel Recommendations are retrieved through the corresponding distribution service, if those details were not already given by the Low Fare Search (LFS) response.

Figure 2B:
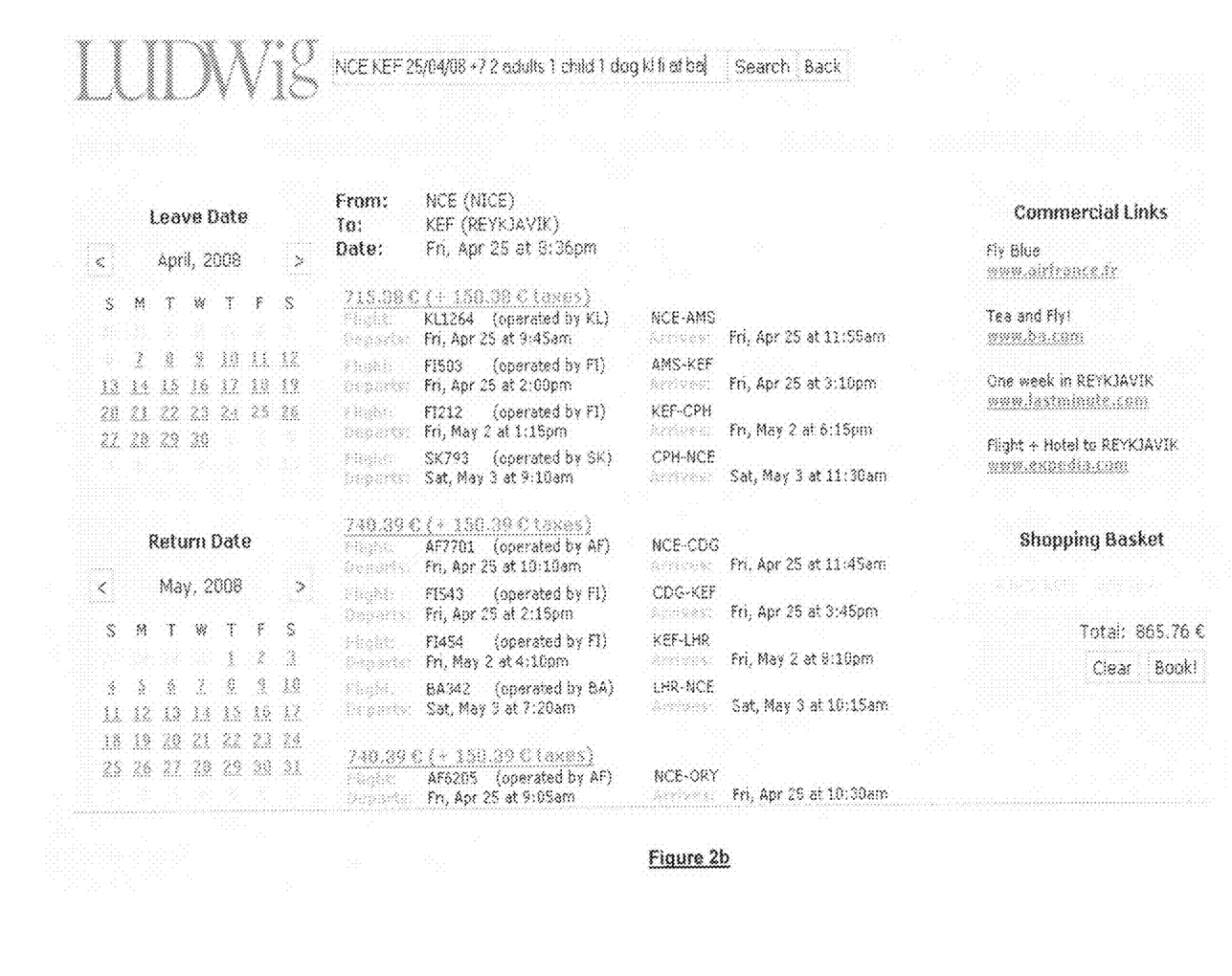
FIG. 2b shows one embodiment of a possible response web page according to the invention.

The user request is restated, as understood, within a new search request input field, at the top of the page. That distribution display is shown in FIG. 2b.

When the user clicks on the hyper-link of any given Travel Recommendation, that latter is booked (i.e., added to the shopping basket). And when the user clicks on the "book" hyper-link of the shopping basket, the corresponding travel solutions are booked, once again through the corresponding GDS service (for instance, "Book flights", "Book hotels", "Rent a car", etc.).

Figure 2C:
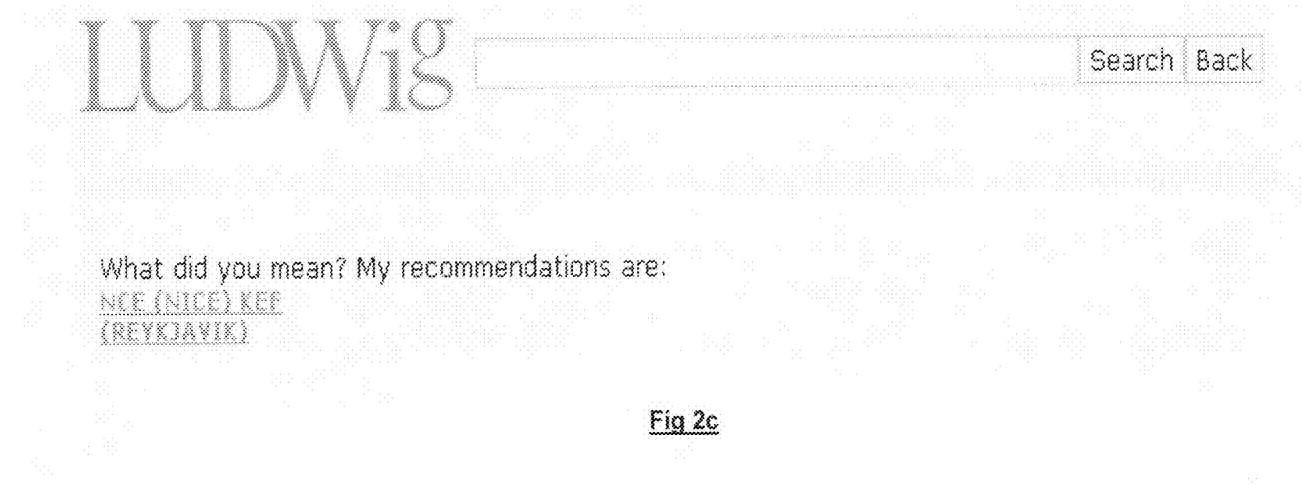
FIG. 2c shows another embodiment of a possible response web page according to the invention.

If some keywords of the user request did not exactly match any of the above-mentioned lists, but are sufficiently close to some of them, a list of corrected suggestions is displayed. That list may take the shape of simple hyperlinks. One example is depicted in FIG. 2c.

When the user clicks on such an hyperlink, the amended request is displayed within the request input field, and the new corresponding result (list of Travel Recommendations) is displayed.

If the request was not understood correctly by the Invention, the user has just to amend it in the request input field and to type enter on the keyboard or click on a "Search" button for the hyperlinks on the new corresponding Travel Recommendation to be displayed.

Furthermore, some advertisements may be displayed on a position of the screen, e.g. the right hand side, targeting the potential recognized needs of the user. For instance, if the user request is "nce mia dec", the Invention understands that the user would like to make a trip from Nice, France, to Miami, Fla., USA, on the next December and proposes, within the advertisement part of the screen, hyper-links on Web sites proposing related travel products, e.g. lastminutes.com proposing trips to the sun of Morocco or Tunisia during December, and/or hotels, car rentals and entertainment (theatre, museum, restaurants, etc) in the destination area.

As the Invention may require interfacing with existing distribution systems, an obvious way to implement it is to use the Web Services of a GDS (for instance, Sabre®, TravelPort® or Amadeus®), even though the Invention is not limited to that kind of protocols. The Invention has then to recognize the user request keywords against some well-known static lists of referential data, e.g. geographical, time- and passenger-related, and to formulate the distribution request with the corresponding syntax and protocol, e.g. XML and SOAP (or XML-RPC or even RESTful) in the case of Web Services. In FIG. 4 we can see an explanatory schema of the overall process.

In FIG. 4, the airport code of Reykjavik, Iceland, is recognized, even though the user misspelled it. Also, if the user does not specify any given year, current year or next year, depending on the current time of the year (for instance, if current time is November, and if the request is made for a departure in March, the request is assumed to be for the next calendar year), is taken into account. Moreover, default values can be assigned to the search parameters when not specified by the user. For instance, if the user wants to go from Nice to Reykjavik, departing the 25$^{th}$ Apr. 2008, the Invention assumes that the user is an adult, searching for the lowest fare in economy class.

All options for all the querying technologies can be potentially parsed by the Parsing Engine, and for power users, even cryptic entries e.g. "AN25APRNCEKEF*" for Amadeus cryptic entry. Whatever the user input is, the request is interpreted and the Low Fare Search (LFS) transaction is processed with a distribution system.

Note that any other algorithm may be used by the Invention. Parts of existing algorithms may also be used. In fact, pieces of algorithm, such as "Approximate Pattern Matching", form a possible part of the implementation of the Invention.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention.

The invention claimed is:

1. A method for processing a travel-related search request comprising:
  receiving, at one or more processors, a free-text input that relates to the travel-related search request, the free-text input comprising a sequence of data strings;
  matching, by the one or more processors, a first portion of the data strings to a first item from a set of pre-determined items and a second portion of the data strings to a second item from the pre-determined items, wherein each of the pre-determined items are associated with a search data field type;
  defining, by the one or more processors, a plurality of search parameters based on the search data field type of the first item and the search data field type of the second item; and
  building, by the one or more processors, a query for the travel-related search request based on the search parameters,
  wherein matching the first portion of the data strings to the first item from the pre-determined items comprises identifying a longest portion of the sequence of data strings that matches a first one of the pre-determined items and defining the first one of the pre-determined items as the first item, and
  wherein matching the second portion of the data strings to the second item from the pre-determined items comprises:
    after matching the first portion of the data strings to the first item, defining a first remaining portion as the difference between the sequence of data strings and the longest portion of the sequence of data strings that matches the first one of the pre-determined items;
    identifying a longest portion of the first remaining portion that matches a second one of the pre-determined items; and
    defining the second one of the pre-determined items as the second item.

2. The method of claim 1, further comprising:
  providing a web page with an input zone for display on a user device, wherein the free-text input is received via the input zone.

3. The method of claim 1, wherein identifying the longest portion of the sequence of data strings that matches the first one of the pre-determined items comprises:
  (i) setting the whole sequence of data strings as a first potential longest portion;
  (ii) comparing the first potential longest portion with the pre-determined items; and
  (iii) performing the following:
    setting the first potential longest portion as the longest portion that matches one of the pre-determined items upon a positive comparison; and
    upon a negative comparison:
      creating a second potential longest portion by removing from the first potential longest portion one of the data strings located at an extremity of the first potential longest portion situated opposite a starting extremity of the sequence of data strings; and
      repeating steps (ii) and (iii) using the second potential longest portion as the first potential longest portion.

4. The method of claim 1, wherein identifying the longest portion of the first remaining portion that matches the second one of the pre-determined items comprises:
  beginning from an extremity situated opposite a starting extremity of the sequence of data strings, identifying the longest portion of the first remaining portion that matches the second one of the pre-determined items.

5. The method claim 4, further comprising:
  matching a third portion of the data strings to a third item from the pre-determined items by:
    defining a second remaining portion as the difference between the first remaining portion and the longest portion of the first remaining portion that matches the second one of the pre-determined items;
    beginning from an extremity situated opposite the starting extremity of the sequence of data strings, identifying a longest portion of the second remaining portion that matches a third one of the pre-determined items; and
    defining the third one of the pre-determined items as the third item; and
  repeating the matching for additional portions of the sequence of data strings until a remaining portion can no longer be defined.

6. The method of claim 1, wherein identifying the longest portion of the sequence of data strings that matches the first one of the pre-determined items comprises:
  determining a distance value between the longest portion of the sequence of data strings and one or more of the pre-determined items.

7. The method according to claim 6, wherein identifying the longest portion of the sequence of data strings that matches the first one of the pre-determined items further comprises:
  setting one of the one or more pre-determined items as the matched first one of the pre-determined items based on the distance value for the one pre-determined item being above a pre-determined threshold.

8. The method according to claim 6, wherein identifying the longest portion of the sequence of data strings that matches the first one of the pre-determined items further comprises:
  in response to the distance value for one of the one or more pre-determined items being above a pre-determined threshold, requesting a user confirmation that the one pre-determined item is to be used in lieu of the longest portion of the sequence of data strings; and upon receipt of the user confirmation, using the one pre-determined item as the first one of the pre-determined items.

9. The method according to claim 8, wherein requesting the user confirmation comprises:

providing an amended sequence of data strings for display at a user device, wherein the amended sequence of data strings includes the sequence data strings from the free-text input without the longest portion of the sequence of data strings, which is replaced by the one pre-determined item.

10. The method of claim 9, wherein the amended sequence of data strings is configured to be displayed as a hyperlink on the user device, and the user confirmation is received upon a user selection of the hyperlink.

11. The method according to claim 1, wherein the search field type of the first item and/or the second item is selected from the group consisting of a travel origin, a travel destination, and a departure date.

12. The method of claim 1, further comprising:

defining one or more default parameters, wherein the query is further based on the default parameters.

13. The method of claim 12, wherein the one or more default parameters are defined based on user profile data.

14. The method of claim 1, wherein the query is a low fare search request.

15. The method of claim 1, further comprising:

sending the query to at least one travel data service;
receiving a response to the query; and
transmitting a reply to the travel-related search request based on the response.

16. The method of claim 15, wherein building a query comprises:

converting the matched first item and/or the matched second item into a formatted item compatible with the travel data service.

17. The method of claim 16, wherein building a query further comprises:

accessing a data repository storing one or more correspondence tables between one or more of the pre-determined items and one or more formatted items, the one or more formatted items including the formatted item compatible with the travel data service.

18. The method of claim 17 further comprising:

incorporating the reply in a web page.

19. The method of claim 18, wherein the web page includes an editable search request definition area filled by default with the sequence of data strings.

20. The method of claim 15, wherein identifying the longest portion of the sequence of data strings that matches the first one of the pre-determined items comprises:

determining a distance value between the longest portion of the sequence of data strings and one or more of the pre-determined items;

in response to the distance value for one of the one or more pre-determined items being above a pre-determined threshold, requesting a user confirmation that the one pre-determined item is to be used in lieu of the longest portion of the sequence of data strings; and upon receipt of the user confirmation, using the one pre-determined item as the matched first one of the pre-determined items, wherein requesting the user confirmation that the one pre-determined item is to be used comprises:

providing an amended sequence of data strings for display at a user device, wherein the amended sequence of data strings includes the sequence of data strings from the free-text input without the longest portion of the sequence of data strings, which is replaced by the one pre-determined item, and a web page configured for display on the user device includes an editable search request definition area filled by default with the amended sequence of data strings.

21. A product comprising:

a non-transitory computer-readable medium; and computer software stored on the medium, wherein the computer software, when executed by at least one data processor, causes the at least one data processor to:

receive a free-text input that relates to the travel-related search request, the free-text input comprising a sequence of data strings;

match a first portion of the data strings to a first item from a set of pre-determined items and a second portion of the data strings to a second item from the pre-determined items, wherein each of the pre-determined items are associated with a search data field type;

define a plurality of search parameters based on the search data field type of the first item and the search data field type of the second item; and build a query for the travel-related search request based on the search parameters, wherein the computer software causes the at least one data processor to match the first portion of the data strings to the first item from the pre-determined items by causing the at least one data processor to identify a longest portion of the sequence of data strings that matches a first one of the pre-determined items and define the first one of the pre-determined items as the first item, and wherein the computer software causes the at least one data processor to match the second portion of the data strings to the second item from the pre-determined items by causing the at least one processor to:

after the first portion of the data strings is matched to the first item, define a first remaining portion as the difference between the sequence of data strings and the longest portion of the sequence of data strings that matches the first one of the pre-determined items;

identify a longest portion of the first remaining portion that matches a second one of the pre-determined items; and define the second one of the pre-determined items as the second item.

22. A system for processing a travel-related search request comprising:

at least one data processor; and a memory coupled to the at least one data processor, the memory storing computer software that, when executed by the at least one data processor, causes the system to:

receive a free-text input that relates to the travel-related search request, the free-text input comprising a sequence of data strings;

match a first portion of the data strings to a first item from a set of pre-determined items and a second portion of the data strings to a second item from the pre-determined items, wherein each of the pre-determined items are associated with a search data field type;

define a plurality of search parameters based on the search data field type of the first item and the search data field type of the second item; and build a query for the travel-related search request based on the search parameters, wherein the computer software causes the system to match the first portion of the data strings to the first item from the pre-determined items by causing the system to identify a longest portion of the sequence of data strings that matches a first one of the pre-determined items and define the first one of the pre-determined items as the first item, and wherein the computer software causes the system to match the second portion of the data strings to the second item from the pre-determined items by causing the system to:

after the first portion of the data strings is matched to the first item, define a first remaining portion as the difference between the sequence of data strings and the longest portion of the sequence of data strings that matches the first one of the pre-determined items;

identify a longest portion of the first remaining portion that matches a second one of the pre-determined items; and define the second one of the pre-determined items as the second item.

\* \* \* \* \*